(12) United States Patent
Tawa, Jr.

(10) Patent No.: US 8,001,088 B2
(45) Date of Patent: Aug. 16, 2011

(54) INDEXING MEDIA FILES IN A DISTRIBUTED, MULTI-USER SYSTEM FOR MANAGING AND EDITING DIGITAL MEDIA

(75) Inventor: Roger Tawa, Jr., Brossard (CA)

(73) Assignee: Avid Technology, Inc., Burlington, MA (US)

( * ) Notice: Subject to any disclaimer, the term of this patent is extended or adjusted under 35 U.S.C. 154(b) by 186 days.

(21) Appl. No.: 10/407,711

(22) Filed: Apr. 4, 2003

(65) Prior Publication Data

US 2004/0199507 A1   Oct. 7, 2004

(51) Int. Cl.
G06F 7/00      (2006.01)
G06F 17/00    (2006.01)

(52) U.S. Cl. ........ 707/673; 707/741; 707/792; 707/830; 715/733

(58) Field of Classification Search .................. 707/515, 707/102, 10, 104.1, 8, 204, 610, 696, 791, 707/830, 913, 741, 673, 792; 395/793; 710/8; 348/231.3; 715/501.1, 515, 733; 386/46; 714/4; 709/213, 247

See application file for complete search history.

(56) References Cited

U.S. PATENT DOCUMENTS

| | | |
|---|---|---|
| 3,721,757 A | 3/1973 | Ettlinger |
| 4,280,192 A | 7/1981 | Moll |
| 4,412,306 A | 10/1983 | Moll |
| 4,521,870 A | 6/1985 | Babbel et al. |
| 4,538,188 A | 8/1985 | Barker et al. |
| 4,591,931 A | 5/1986 | Baumeister |
| 4,635,136 A | 1/1987 | Ciampa et al. |
| 4,641,203 A | 2/1987 | Miller |
| 468,983 A | 8/1987 | Efron |
| 4,709,277 A | 11/1987 | Ninomiya et al. |
| 4,717,971 A | 1/1988 | Sawyer |
| 4,723,181 A | 2/1988 | Hickok |
| 4,729,044 A | 3/1988 | Kiesel |
| 4,746,994 A | 5/1988 | Ettlinger |
| 4,750,050 A | 6/1988 | Belmares-Sarabia |

(Continued)

FOREIGN PATENT DOCUMENTS

EP       240794       10/1987

(Continued)

OTHER PUBLICATIONS

Abe, et al., "Scene Retrieval Method for Video Database Applications Using Temporal Condition Changes", International Workshop on Industrial Application of Machine Intellegence and Vision, Tokyo, Japan, Apr. 1998, pp. 355-359.

(Continued)

*Primary Examiner* — Giovanna Colan
(74) *Attorney, Agent, or Firm* — Oliver Strimpel

(57) ABSTRACT

A scalable infrastructure indexes and tracks media data and metadata in a distributed, multi-user system. An indexer is associated with particular storage locations, such as a disk, or a directory on a disk, to maintain an index of media files or metadata stored in those storage locations. The indexer monitors activity on any storage location with which it is associated. Any additions, deletions or modifications to files in that storage location cause the indexer to update its index. This index then can be accessed by any of a number of applications in the same manner as conventional indexes. There may be different indexers for different storage locations. Separate indexers may be provided for media files and compositions that use those media files.

14 Claims, 1 Drawing Sheet

U.S. PATENT DOCUMENTS

| | | | |
|---|---|---|---|
| 4,754,342 A | 6/1988 | Duffy | |
| 4,868,687 A | 9/1989 | Penn et al. | |
| 4,899,229 A | 2/1990 | Hashimoto | |
| 4,914,527 A | 4/1990 | Asai et al. | |
| 4,918,588 A | 4/1990 | Barrett et al. | |
| 4,931,950 A | 6/1990 | Isle et al. | |
| 4,937,685 A | 6/1990 | Barker et al. | |
| 4,941,125 A | 7/1990 | Boyne | |
| 4,949,193 A | 8/1990 | Kiesel | |
| 4,954,969 A | 9/1990 | Tsumura | |
| 4,964,004 A | 10/1990 | Barker | |
| 4,972,274 A | 11/1990 | Becker et al. | |
| 4,974,178 A | 11/1990 | Izeki et al. | |
| 4,979,050 A | 12/1990 | Westland et al. | |
| 4,989,191 A | 1/1991 | Kuo | |
| 4,996,664 A | 2/1991 | Fujiwara et al. | |
| 5,006,939 A | 4/1991 | Cawley | |
| 5,091,849 A | 2/1992 | Davis et al. | |
| 5,099,337 A | 3/1992 | Cury | |
| 5,101,364 A | 3/1992 | Davenport et al. | |
| 5,109,482 A | 4/1992 | Bohrman | |
| 5,111,409 A | 5/1992 | Gasper et al. | |
| 5,148,330 A | 9/1992 | Duurland et al. | |
| 5,173,953 A | 12/1992 | Wataya et al. | |
| 5,262,875 A | 11/1993 | Mincer et al. | |
| 5,267,351 A * | 11/1993 | Reber et al. | 707/104.1 |
| 5,319,453 A | 6/1994 | Copriviza et al. | |
| 5,363,487 A * | 11/1994 | Willman et al. | 710/8 |
| 5,584,006 A | 12/1996 | Reber et al. | |
| 5,655,117 A | 8/1997 | Goldberg et al. | |
| 5,668,639 A | 9/1997 | Martin | |
| 5,685,003 A * | 11/1997 | Peltonen et al. | 715/531 |
| 5,713,017 A * | 1/1998 | Lin et al. | 707/8 |
| 5,732,184 A | 3/1998 | Chao et al. | |
| 5,754,851 A | 5/1998 | Wissner | |
| 5,760,767 A | 6/1998 | Shore et al. | |
| 5,970,496 A * | 10/1999 | Katzenberger | 1/1 |
| 6,012,068 A * | 1/2000 | Boezeman et al. | 707/104.1 |
| 6,061,758 A | 5/2000 | Reber et al. | |
| 6,108,645 A * | 8/2000 | Eichstaedt et al. | 707/741 |
| 6,237,011 B1 * | 5/2001 | Ferguson et al. | 715/515 |
| 6,332,141 B2 * | 12/2001 | Gonzalez et al. | 707/10 |
| 6,741,996 B1 * | 5/2004 | Brechner et al. | 707/102 |
| 6,868,439 B2 * | 3/2005 | Basu et al. | 709/213 |
| 7,131,059 B2 * | 10/2006 | Obrador | 715/209 |
| 7,587,520 B1 * | 9/2009 | Kent et al. | 709/247 |
| 2003/0005350 A1 * | 1/2003 | Koning et al. | 714/4 |
| 2003/0020745 A1 * | 1/2003 | Kawaguchi et al. | 345/733 |
| 2003/0068154 A1 * | 4/2003 | Zylka | 386/46 |
| 2004/0025180 A1 * | 2/2004 | Begeja et al. | 725/46 |
| 2004/0070678 A1 * | 4/2004 | Toyama et al. | 348/231.3 |

FOREIGN PATENT DOCUMENTS

| | | |
|---|---|---|
| EP | 268270 | 5/1988 |
| EP | 273435 | 7/1988 |
| EP | 390048 | 10/1990 |
| EP | 403118 | 12/1990 |
| EP | 424903 | 5/1991 |
| EP | 469850 | 2/1992 |
| EP | 526064 | 2/1993 |
| EP | 113993 | 7/1994 |
| JP | 1-233489 | 9/1989 |
| JP | 2000099380 A * | 4/2000 |

OTHER PUBLICATIONS

Amato, Mia, "Macintosh Video Editing Evolving into Beta Stage", Mac Week, v. 3, n. 31, Aug. 22, 1989, pp. 33-35.

Anderson, Gary, "Preparing for Post Production: an Excerpt from Gary Anderson's Book—Video Editing", Back Stage, v. 26, Dec. 6, 1986, pp. 6-14.

Arthur Schneider, "Edit List Management", SMPTE Journal, vol. 88, Aug. 1979, pp. 538-542.

Baron, S.N., "The Next Generation of Automated Record/playback Systems", International Broadcasting Convention, 1988, pp. 418-421.

Bunish, Christine, "Magno Sound & Video debuts TRANSform-1 in New York", Back Stage, v. 28, Jul. 1987, p. 5.

Davidoff, Frank, "The All-Digital Television Studio", SMPTE Journal, vol. 89, No. 6, Jun. 1980, pp. 445-449.

Gardner, L.J. et al., "A Closed-Loop Digital Video Editing System", presented at 131 sup.st SMPTE Technical Conference in Los Angeles (paper No. 131-94), on Oct. 23, 1989, pp. 634-638.

Guglielmo, Connie, "Mac II Pushes Deeper into Professional Markets; Movies: Film Editing Goes Desktop", Mac Week, v. 2, n. 46, Nov. 15, 1988, pp. 2.

Heidmann et al., "Future Direction in Desktop Video", ACM SIGGRAPH 89 Panel Proceedings, Jul. 1989, pp. 241-255.

Ito, Russel, "The Producers", MacUser, v. 4, n. 10, Oct. 1988, pp. 128-135.

Mackay et al., "Virtual Video Editing in Interactive Multimedia Application", Communications of the ACM, vol. 32, issue 7, Jul. 1989, pp. 802-810.

MacNicol, Gregory, "Video Editing", Computer Graphics World, v. 12, n. 6, Jun. 1989, pp. 87.

Miller, Richard, "The Many Paths toward conforming—Post Production and Editing of Film and Video", Back Stage, v. 26, Dec. 6, 1985, pp. 3-5.

Nikkei Electronics Apr. 17, 1989 (No. 471), "Multimedia Toward the $21^{st}$ Century", pp. 124-146.

R. Hutchinson et al., "Media Management and Control of Video Disks", International Broadcasting Convention, Sep. 1995, Conference Publication No. 413, Copyrgt.IEE 1995, pp. 310-315.

* cited by examiner

INDEXING MEDIA FILES IN A DISTRIBUTED, MULTI-USER SYSTEM FOR MANAGING AND EDITING DIGITAL MEDIA

BACKGROUND

In a system for managing and editing digital media, it is useful to have an index that indicates which media is accessible to the system. Such indexing typically is performed by identifying media files among the computer data files that are accessible to the system. Any identified media files then are indexed. In a distributed or multi-user system, such indexing becomes more complex because files are shared and typically are distributed among several storage locations.

SUMMARY

A scalable infrastructure indexes and tracks media data and metadata in a distributed, multi-user system. An indexer is associated with particular storage locations, such as a disk, or a directory on a disk, to maintain an index of media files or metadata stored in those storage locations. The indexer monitors activity on any storage location with which it is associated. Any additions, deletions or modifications to files in that storage location cause the indexer to update its index. This index then can be accessed by any of a number of applications in the same manner as conventional indexes. There may be different indexers for different storage locations. Separate indexers may be provided for media files and compositions that use those media files.

Accordingly, in one aspect, a method and computer program product is provided for indexing media files. Storage locations in which media files are stored are monitored. After modification of the media files on the monitored storage location, an index of the media files in the monitored storage location is updated.

In another aspect, a method and computer program product is provided for indexing project files. Storage locations in which project files are stored are monitored. After modification of the project files on the monitored storage location, an index of the project files in the monitored storage location is updated.

DETAILED DESCRIPTION

Figure 1:
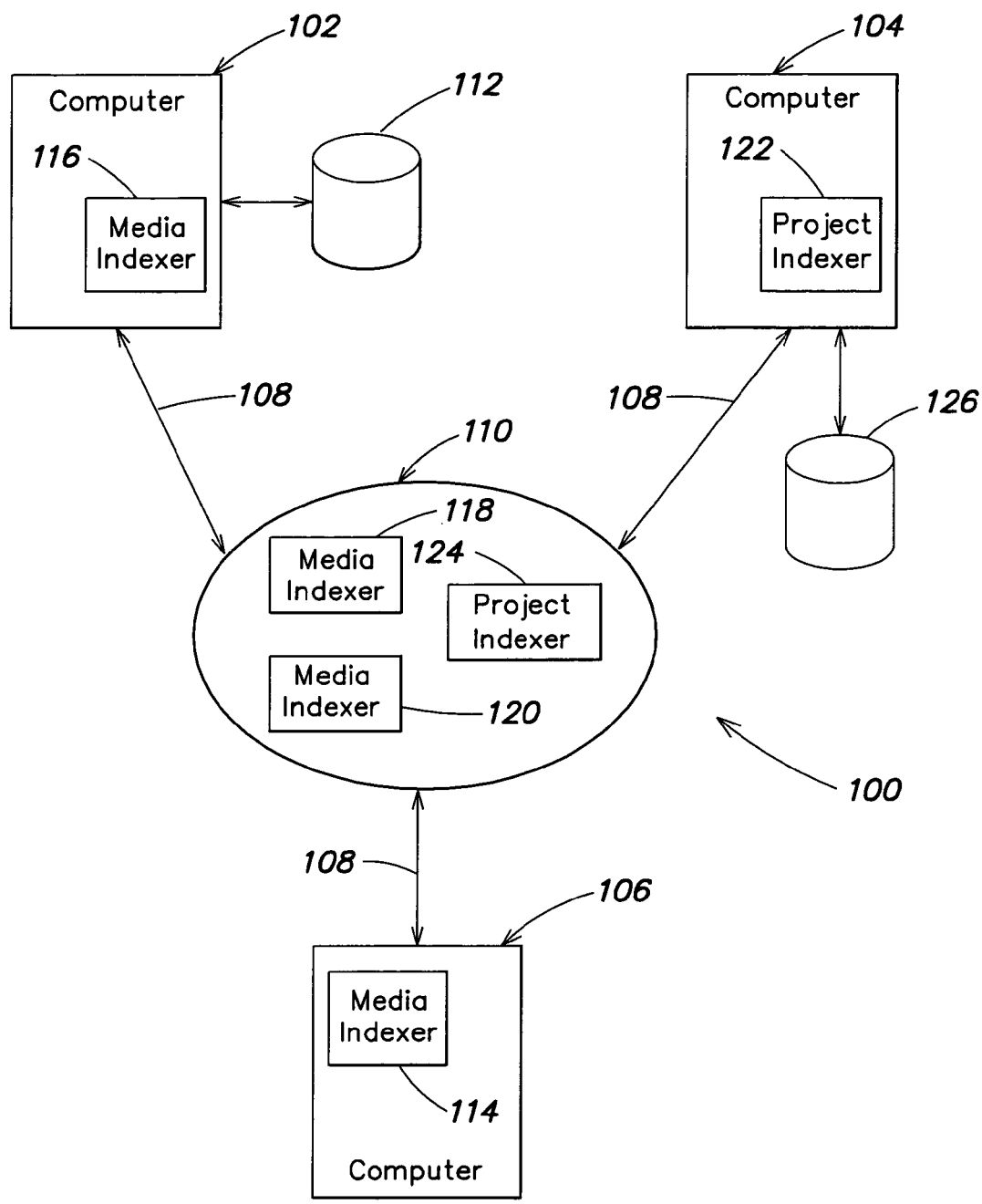
FIG. 1 is a diagram of an example, distributed, multi-user system for collaborative managing and editing of digital media.

Referring now to FIG. 1, a diagram of an example distributed, multi-user system for collaborative managing and editing digital media will now be described. Digital media includes, but is not limited to, video data, sound data, image data and animation data. Such a system 100 may have multiple applications on multiple computers 102, 104 and 106 that are interconnected through a computer network 108 to storage 110. The invention is not limited to any particular configuration of computers, networks and storage. A computer, e.g., 102 also may have its own local storage 112.

A media indexer, 114, 116, 118, 120 is associated with particular storage locations, such as a disk, or directory on a disk, to maintain an index of media files for those locations. A media indexer, e.g., 116 may reside on a computer for indexing local storage, e.g., 112, attached to that computer. One or more media indexers, e.g., 118 and 120, may reside on shared storage. Another media indexer, e.g., 114, may reside on a computer 106 but index files stored on the shared storage to which the computer is connected.

Similarly a project indexer, e.g., 122, 124, also is associated with particular storage locations, such as a disk, or directory on a disk, to maintain an index of compositional metadata stored in files in those locations. A project indexer, e.g., 122 may reside on a computer for indexing local storage, e.g., 126, attached to that computer. One or more project indexers, e.g., 124, may reside on shared storage. A project indexer also may reside on a computer but index files stored on the shared storage to which the computer is connected.

As indicated in FIG. 1, there may be different indexers for different storage locations. In a distributed, multi-user system, multiple indexers balance the search load and provide scalability.

The media indexer and project indexer will now be described in more detail.

A media indexer maintains an index that associates metadata about the media data with the name (e.g., the path and filename) of a media file that includes that media data. The metadata also may be stored in the media file. Such metadata may include, for example, an indication of a source from which the media was obtained, such as a tape name, a range of data from the source, such as start and stop time codes in the source, and an indication of the quality of the media data. In the process of indexing a media file, any metadata included in the media file is extracted from the media file and stored in the index along with the name of the media file. Example indexes for media files are described in U.S. Pat. No. 5,267,351 and U.S. Pat. No. 6,157,929, which are hereby incorporated by reference. An index may be maintained as a multidimensional database. For example, the database may be a table of "media slots" where each media slot corresponds to a time span and a quality. This database permits a search of whether a media file is available that corresponds to specified metadata, such as specified time span of a source and a specified quality. The database may be implemented to perform federated and chained searches.

To maintain such an index, a media indexer monitors activity on any storage location with which it is associated. How the monitoring is performed depends on the operating system and file system that manages the storage locations and how the indexer can communicate with the operating system and file system. For example, this monitoring of local storage on a Windows platform may be performed by registering a process for the indexer to receive notifications of changes from the Windows file system. This mechanism is called the ReadDirectoryChangesW application programming interface (API) in the Windows operating system. For remote storage using the Windows operating system, a similar mechanism may be used, called the FindFirstChangeNotification and FindNextChangeNotification APIs in the Windows operating system. In such an embodiment, any additions, deletions or other modifications to files in the designated storage locations cause a notification to be sent to the media indexer, which in turn updates its index. Other ways to perform such monitoring include having the indexer periodically poll or scan the file system for information to detect changes, or to have the operating system provide a form of notification through an interrupt or event to be processed. The index then can be accessed by any of a number of applications in the same manner as conventional indexes.

Because there may be many different types of media data and thus media files, a plug-in architecture may be used to allow for specification of new types of media files. Such a structure, herein called a table adapter, is provided for this purpose. A table adapter extracts the media metadata from the media file, in whatever form it may be, and then "adapts" it to structure of the database stored by the media indexer. This architecture permits any media file type to be indexed so long as a specific table adapter for the media file type is created.

The foregoing described indexing of media files and metadata about media data. Another kind of metadata is compositional metadata. Compositional metadata is metadata that describes how media is combined to create master clips, sequences and projects, for example, and may be understood as capturing creative decisions about the media in a project. Such compositional metadata also may be indexed. A project indexer thus tracks which elements of the compositional metadata use which media files.

The compositional metadata that may be stored depends on how a composition is represented by the editing application. Example kinds of compositional metadata include those defined for the Advanced Authoring Format (AAF) and the Open Media Framework (OMF). In general, projects are collections of compositions, which are collections of other objects that reference media files. A project indexer would map the relationships among projects, compositions, other objects and the references to media files.

As a particular example, each element of the compositional metadata may be structured as a directed acyclic graph (DAG) that has a time span. Each element in a DAG is called an operator. Each operator may reference media or may perform an operation on media. Master clips and sequences reference one or more DAGs. A project may reference one or more master clips and/or sequences. A secure one-way hash function may be used to generate one or more digests of each element of a DAG, based on the state of the element itself and the digests of the children elements in the DAG. Each digest is called a data alias. A data alias acts a reasonably unique identifier for a given time span of a given element in the DAG. There is a one-to-one correspondence between a media slot in the media index and a data alias. Each compositional metadata element is associated with one or more data aliases. In this example, the index developed by the project indexer maps each element of compositional metadata to the one or more compositional metadata elements that it includes, and/or to the data alias for the media file it references.

The project indexer, similar to the media indexer, is associated with one of more storage locations where compositional metadata files, such as masterclip files, sequence files and project files or directories, are stored. The project indexer monitors its associated disk locations and maintains a project database consistent at all times with contents of the associated storage locations, without any external intervention.

Such indexes may be used by other applications for several purposes. Other applications may access the indexers, and their respective indices, in several ways. For example, a registry of available services may be maintained in a system. An example of such a registry is a service location protocol, such as defined by Internet Standard RFC 2608. An indexer may register with this registry providing information about the computer the indexer is running on, and any port number and protocol to use to communicate with it. Any application looking for an indexer may search the registry for available indexers. An application and indexer may be designed to communicate using a conventional protocol such as the distributed component object model (DCOM) or the simple object access protocol (SOAP).

For example, the media indexer may be used by an editing application to find media after or while a sequence is loaded and being edited by the user. After a sequence is loaded in memory by the editing application, for each element in the sequence the corresponding data aliases may be identified. Each media indexer may be queried to lookup a particular media file that matches the data alias. That media file then may be linked to that element in the sequence.

Both the media indexer and project indexer allow a variety of media management functions to be performed. Example media management functions include, but are not limited to purging media, finding master clips and sequences associated with media, and navigation of metadata and media data relationships.

For example, for purging media data related to a sequence, the media slots referred to by a masterclip or sequence are identified from the masterclip and sequence. The project indexer is accessed to determine which other masterclips and sequences use the same media slots. The media files corresponding to the media slots that are not used by other masterclips and sequences are then located using the media index.

As another example, given a media file, the media indexer can be accessed to look up the media slots that use it. The project indexer then can be used to identify the master clips and/or sequences that refer to them.

The various components of the system described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, a cathode ray tube (CRT) display, liquid crystal displays (LCD) and other video output devices, printers, communication devices such as a modem, and storage devices such as disk or tape. One or more input devices may be connected to the computer system. Example input devices include, but are not limited to, a keyboard, keypad, track ball, mouse, pen and tablet, communication device, and data input devices. The invention is not limited to the particular input or output devices used in combination with the computer system or to those described herein.

The computer system may be a general purpose computer system which is programmable using a computer programming language, such as "C++," Visual Basic, JAVA or other language, such as a scripting language or even assembly language. The computer system may also be specially programmed, special purpose hardware. In a general-purpose computer system, the processor is typically a commercially available processor, such as various processors available from Intel, AMD, Cyrix, Motorola, and IBM. The general-purpose computer also typically has an operating system, which controls the execution of other computer programs and provides scheduling, debugging, input/output control, accounting, compilation, storage assignment, data management and memory management, and communication control and related services. Example operating systems include, but are not limited to, the UNIX operating system and those available from Microsoft and Apple Computer.

A memory system typically includes a computer readable medium. The medium may be volatile or nonvolatile, writeable or nonwriteable, and/or rewriteable or not rewriteable. A memory system stores data typically in binary form. Such data may define an application program to be executed by the microprocessor, or information stored on the disk to be processed by the application program. The invention is not limited to a particular memory system.

A system such as described herein may be implemented in software or hardware or firmware, or a combination of the three. The various elements of the system, either individually or in combination may be implemented as one or more computer program products in which computer program instructions are stored on a computer readable medium for execution by a computer. Various steps of a process may be performed by a computer executing such computer program instructions. The computer system may be a multiprocessor computer system or may include multiple computers connected over a computer network. A system such as described herein may be designed as separate modules of a computer program, or may be separate computer programs, which may be operable on separate computers. The data produced by these components may be stored in a memory system or transmitted between computer systems.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A computer-implemented method for indexing files for multimedia compositions stored in storage locations of first and second storage devices, wherein a first operating system is associated with the first storage device and a second operating system is associated with the second storage device,
   wherein a multimedia composition comprises a collection of objects stored in one or more project files, wherein objects describe temporal relationships among temporal media data, and wherein objects reference other objects or media files;
   wherein a media file includes temporal multimedia content and corresponding metadata,
   in a distributed, multi-user system for collaborative editing of multimedia compositions, wherein a plurality of users read and write the project files and the media files stored on the first and second storage devices for editing the multimedia compositions, and wherein the plurality of users identify the files accessible for editing by accessing a central index,
   the method comprising, during the editing of multimedia compositions by the plurality of users:
   monitoring the plurality of storage locations on which files for the multimedia compositions are stored to detect modification by one or more of the plurality of users of the files on the monitored storage locations, wherein monitoring the plurality of storage locations comprises:
      using a first mechanism included in the first operating system associated with the first storage device to detect the modification of the files on the monitored storage locations on the first storage device,
      using a second mechanism included in the second operating system associated with the second storage device to detect the modification of the files on the monitored storage locations on the second storage device,
      using the first mechanism included in the first operating system to issue a notification to an indexer when such a modification is detected to files on the first storage device, and
      using the second mechanism included in the second operating system to issue a notification to the indexer when such a modification is detected to files on the second storage device;
   receiving at the indexer the notifications from the first and second mechanisms included in the first and second operating systems; and
   in response to each received notification of the modification of the files on one of the monitored storage locations received at the indexer, updating the central index of the files by,
      if the notification relates to a media file, then storing metadata extracted from the media file in the index along with a name for the media file;
      if the notification relates to a project file, then storing metadata extracted from the project file such that, if an object includes a reference to a media file then metadata is stored along with a name for the media file, and if the object references other objects, then the metadata is stored along with information describing relationships with the other objects;
   whereby the index is continually updated as media files and project files are being added and modified while multimedia compositions are edited.

2. The computer-implemented method of claim 1, wherein monitoring comprises:
   registering for notification of modification of the media files on the monitored storage locations from an operating system that manages files in the storage location.

3. The computer-implemented method of claim 1, wherein updating comprises:
   reading a modified media file to extract metadata about the media file; and
   storing the metadata in the index.

4. A computer program product comprising:
   a computer readable storage medium;
   computer program instructions stored on the computer readable storage medium that, when executed by a computer, instruct the computer to perform a method for indexing files for multimedia compositions stored in storage locations of first and second storage devices, wherein a first operating system is associated with the first storage device and a second operating system is associated with the second storage device,
   wherein a multimedia composition comprises a collection of objects stored in one or more project files, wherein objects describe temporal relationships among temporal media data, and wherein objects reference other objects or media files;
   wherein a media file includes temporal multimedia content and corresponding metadata,
   in a distributed, multi-user system for collaborative editing of multimedia compositions, wherein a plurality of users read and write the project files and the media files stored on the first and second storage devices for editing multimedia compositions, and wherein the plurality of users identify the files accessible for editing by accessing a central index, comprising:
   instructions that, when executed by a computer, instruct the computer to monitor storage locations on which files for multimedia compositions are stored to detect modification by one or more of the plurality of users of the files on the monitored storage locations, wherein the instructions to instruct the computer to monitor the storage locations comprises:
      instructions to use a first mechanism included in the first operating system associated with the first storage device to detect the modification of the files on the monitored storage location on the first storage device,
      instructions to use a second mechanism included in the second operating system associated with the second storage device to detect the modification of the files on the monitored storage locations on the second storage device, instructions to issue, from the first mechanism, a notification to an indexer when such a modification is detected to files on the first storage device, and instructions to issue, from the second mechanism, a notification to the indexer when such a modification is detected to files on the second storage device;

instructions to receive at the indexer the notifications from the first and second mechanisms included in the first and second operating systems; and instructions that, when executed by a computer, instruct the computer, in response to each received notification of the modification of the files on one of the monitored storage locations received at the indexer, to update the central index of the files using the indexer, by, if the notification relates to a media file, then storing metadata extracted from the media file in the index along with a name for the media file;

if the notification relates to a project file, then storing metadata extracted from the project file such that, if an object includes a reference to a media file then metadata is stored along with a name for the media file, and if the object references other objects, then the metadata is stored along with information describing relationships with the other objects;

whereby the index is continually updated as media files and project files are added and modified while multimedia compositions are edited.

5. The computer program product of claim 4, wherein monitoring comprises:
registering for notification of modification of the media files on the monitored storage locations from an operating system that manages files in the storage location.

6. The computer program product of claim 4, wherein updating comprises:
reading a modified media file to extract metadata about the media file; and
storing the metadata in the index.

7. The computer-implemented method of claim 1, wherein monitoring comprises:
registering for notification of modification of the project files on the monitored storage locations from an operating system that manages files in the storage location.

8. The computer-implemented method of claim 1, wherein updating comprises:
reading a modified project file to extract compositional metadata; and
storing the compositional metadata in the index.

9. The computer program product of claim 4, wherein monitoring comprises:
registering for notification of modification of the project files on the monitored storage locations from an operating system that manages files in the storage location.

10. The computer program product of claim 4, wherein updating comprises:
reading a modified project file to extract compositional metadata; and
storing the compositional metadata in the index.

11. The computer program product of claim 4, wherein each of the plurality of users can edit sequences of media files, wherein sequences are indexed in the index of the project files and media files are indexed in an index of media files.

12. A multi-user system for collaborative managing and editing of multimedia compositions, wherein a multimedia composition includes a collection of objects stored in one or more project files, wherein objects describe temporal relationships among temporal media data, and wherein objects reference other objects or media files wherein a media file includes temporal multimedia content and corresponding metadata, the system comprising:

a first computer associated with a first storage device wherein a first operating system is associated with the first storage device;

a second computer associated with a second storage device wherein a second operating system is associated with the second storage device, and wherein the second computer is connected to the first computer through a computer network such that the first and second computers can store data on the first and second storage devices;

a central indexer configured to maintain an index of files for multimedia compositions stored in storage locations on the first and second storage devices, and to detect modification by one or more of a plurality of users of the files to update the index, wherein:

a first mechanism included in the first operating system is configured to detect modification of the files on the monitored storage locations on the first storage device and to issue a notification to the central indexer when such a modification is detected; and a second mechanism included in the second operating system is configured to detect modification of the files on the monitored storage locations on the second storage device and to issue a notification to the central indexer when such a modification is detected; and the central indexer is configured to receive the notifications from the mechanisms included in the first and second operating systems of the first and second computers; and in response to notifications of the modification of the files on one of the monitored storage locations received at the central indexer from the mechanisms included in the first and second operating systems of the first and second computers, the central indexer is configured to update the index of the files, by:

if the notification relates to a media file, then storing metadata extracted from the media file in the index along with a name for the media file;

if the notification relates to a project file, then storing metadata extracted from the project file such that, if an object includes a reference to a media file then metadata is stored along with a name for the media file, and if the object references other objects, then the metadata is stored along with information describing relationships with the other objects;

whereby the index is continually updated as media files and project files are added and modified while multimedia compositions are edited.

13. The system of claim 12, wherein the indexer is further configured to receive notification of modification of the media files on the monitored storage locations from the operating system that manages files in the storage location.

14. The system of claim 12, wherein the indexer is further configured to:
read a modified media file to extract metadata about the media file; and
store the metadata in the index.

* * * * *